US009400709B2

(12) United States Patent
Matsusaka

(10) Patent No.: US 9,400,709 B2
(45) Date of Patent: Jul. 26, 2016

(54) INFORMATION PROCESSING APPARATUS, AND METHOD FOR RESTARTING INPUT/OUTPUT CONTROL PORTION

(71) Applicant: KYOCERA Document Solutions Inc., Osaka-shi, Osaka (JP)

(72) Inventor: Tetsuya Matsusaka, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 135 days.

(21) Appl. No.: 14/295,253

(22) Filed: Jun. 3, 2014

(65) Prior Publication Data
US 2014/0380098 A1 Dec. 25, 2014

(30) Foreign Application Priority Data
Jun. 21, 2013 (JP) ................. 2013-130261

(51) Int. Cl.
*G06F 11/00* (2006.01)
*G06F 11/07* (2006.01)
*G06F 11/14* (2006.01)

(52) U.S. Cl.
CPC ........ *G06F 11/0793* (2013.01); *G06F 11/0727* (2013.01); *G06F 11/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,374,415 A * | 2/1983 | Cormier | ........... | G06F 13/10 710/15 |
| 4,618,954 A * | 10/1986 | Otobe | ........... | G01D 21/00 714/45 |
| 5,740,028 A * | 4/1998 | Sugiyama | ........... | G06F 3/1294 700/28 |
| 6,032,265 A * | 2/2000 | Oguro | ........... | G06F 11/2017 714/5.11 |
| 6,567,865 B1 * | 5/2003 | Araki | ........... | G06F 9/5016 709/213 |
| 6,690,491 B1 * | 2/2004 | Kondo | ........... | G06K 15/02 358/3.01 |
| 6,802,062 B1 * | 10/2004 | Oyamada | ........... | G06F 9/45558 718/1 |
| 8,321,608 B2 * | 11/2012 | Osaki | ........... | G06F 11/2094 710/19 |
| 2002/0049923 A1 | 4/2002 | Kanazawa et al. | | |
| 2002/0087749 A1 * | 7/2002 | Tomioka | ........... | G06F 11/2041 710/1 |
| 2004/0230783 A1 * | 11/2004 | Brice, Jr. | ........... | H04L 41/0816 713/1 |
| 2005/0050401 A1 * | 3/2005 | Matsuki | ........... | G06F 11/0778 714/42 |
| 2006/0277445 A1 | 12/2006 | Kano et al. | | |
| 2009/0292945 A1 | 11/2009 | Kano et al. | | |
| 2009/0319111 A1 * | 12/2009 | Tu | ........... | B60L 1/00 701/22 |
| 2011/0161728 A1 | 6/2011 | Kano et al. | | |

FOREIGN PATENT DOCUMENTS

| | | |
|---|---|---|
| JP | 2002023967 A | 1/2002 |
| JP | 2006338626 A | 12/2006 |
| JP | 2010134696 A | 6/2010 |

\* cited by examiner

*Primary Examiner* — Amine Riad
(74) *Attorney, Agent, or Firm* — Alleman Hall McCoy Russell & Tuttle LLP

(57) ABSTRACT

An information processing apparatus according to one aspect of the present disclosure includes an input/output control portion and a restart control portion. The input/output control portion is configured to be able to have a plurality of electronic devices connected thereto, and is configured to control input/output between each electronic device and the information processing apparatus. The restart control portion is configured to switch whether to restart the input/output control portion in a case where an abnormality defined in advance has occurred with respect to an electronic device, in accordance with the number of the electronic devices connected to the input/output control portion.

7 Claims, 4 Drawing Sheets

INFORMATION PROCESSING APPARATUS, AND METHOD FOR RESTARTING INPUT/OUTPUT CONTROL PORTION

INCORPORATION BY REFERENCE

This application is based upon and claims the benefit of priority from the corresponding Japanese Patent Application No. 2013-130261 filed on Jun. 21, 2013, the entire contents of which are incorporated herein by reference.

BACKGROUND

The present disclosure relates to an information processing apparatus including an input/output control portion to which a plurality of electronic devices can be connected.

In general, in a case where an abnormality has occurred in a drive device connected to an information processing apparatus such as a personal computer, a technique has been known to restart the drive device to eliminate the abnormality. There are cases where this type of information processing apparatus is provided with an input/output control portion which communicably connects a plurality of drive devices to the information processing apparatus. In such a configuration, for example, in a case where a communication abnormality has occurred with respect to a certain drive device, it is conceivable that the cause for the communication abnormality does not lie in the drive device but in the input/output control portion. Therefore, as a technique for eliminating the communication abnormality with respect to the drive device, it is also conceivable to restart the input/output control portion, in addition to restarting the drive device. In this case, the restart of the input/output control portion may affect operation of drive devices in which no abnormalities have occurred.

SUMMARY

An information processing apparatus according to one aspect of the present disclosure includes an input/output control portion and a restart control portion. The input/output control portion is configured to be able to have a plurality of electronic devices connected thereto, and is configured to control input/output between each electronic device and the information processing apparatus. The restart control portion is configured to switch whether to restart the input/output control portion in a case where an abnormality defined in advance has occurred with respect to an electronic device, in accordance with the number of the electronic devices connected to the input/output control portion.

A method for restarting an input/output control portion according to the present disclosure is a method to be executed by an information processing apparatus including an input/output control portion configured to be able to have a plurality of electronic devices connected thereto, the input/output control portion configured to control input/output between each electronic device and the information processing apparatus. In the method for restarting the input/output control portion, the number of the electronic devices connected to the input/output control portion is determined. Then, in the method for restarting the input/output control portion, whether to restart the input/output control portion in a case where an abnormality defined in advance has occurred with respect to an electronic device is switched, in accordance with the number of the electronic devices connected to the input/output control portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings, for the understanding of the present disclosure. It should be noted that the following embodiments are examples embodying the present disclosure, and do not limit the technical scope of the present disclosure.

[Schematic Structure of Multifunction Peripheral 10]

Figure 1:
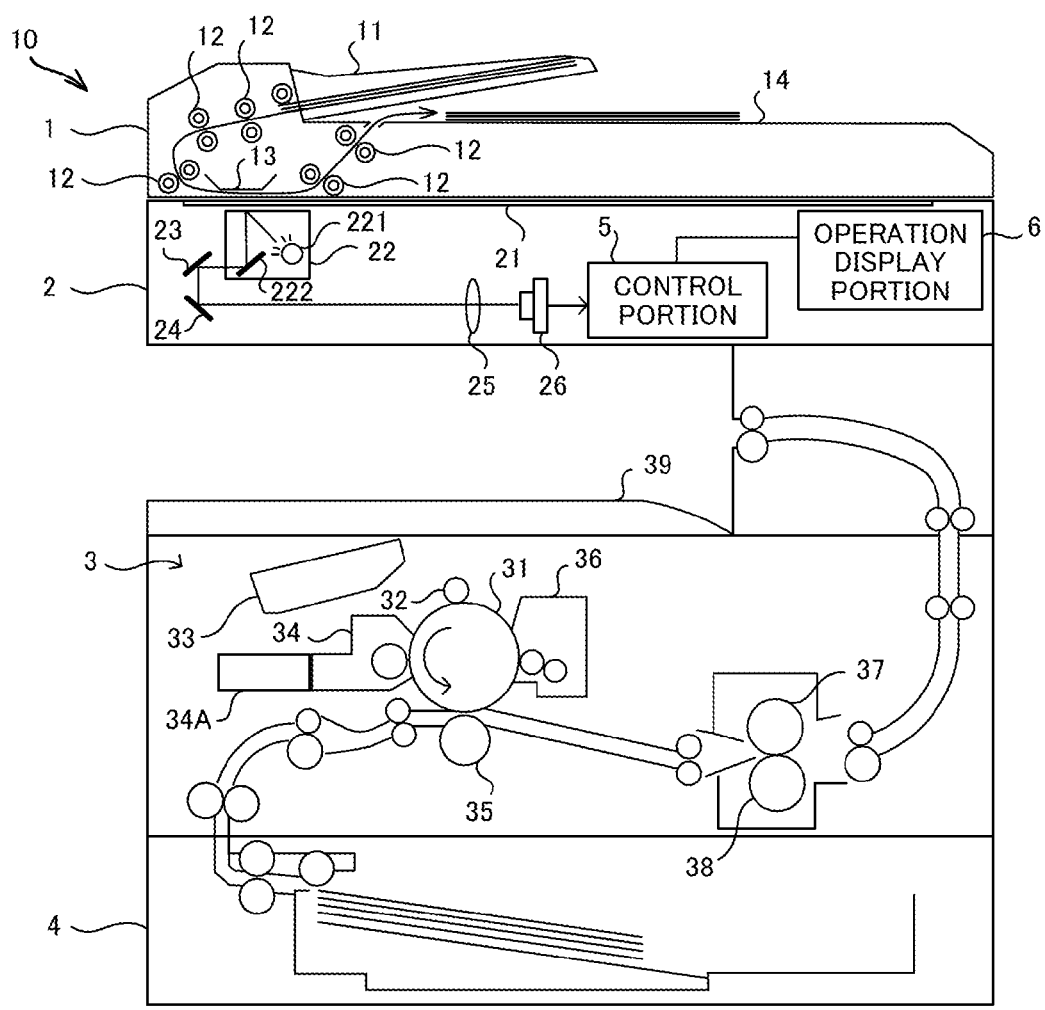
FIG. 1 shows the structure of a multifunction peripheral according to an embodiment of the present disclosure.
Figure 2:
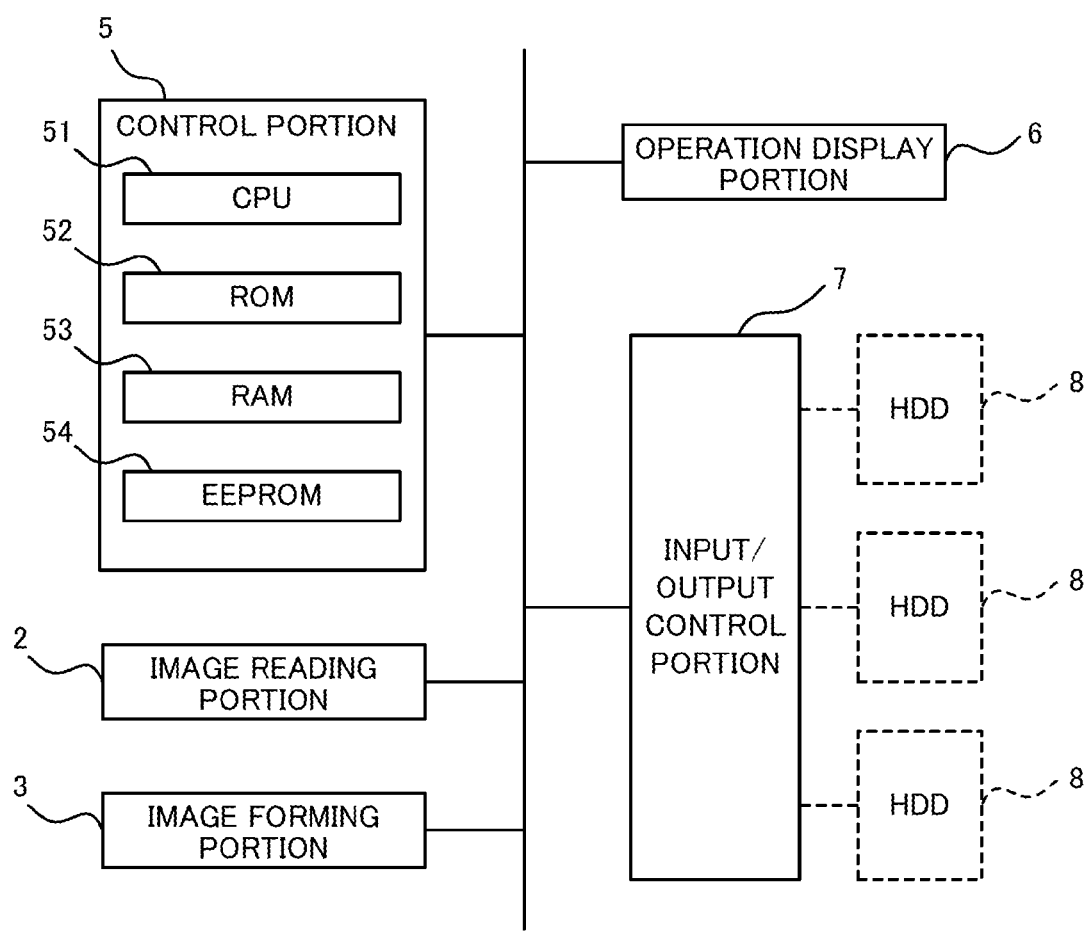
FIG. 2 is a block diagram showing the system configuration of the multifunction peripheral according to the embodiment of the present disclosure.

With reference to FIG. 1 and FIG. 2, the schematic structure of the multifunction peripheral 10 according to an embodiment of the present disclosure will be described. The multifunction peripheral 10 is one example of the information processing apparatus according to the present disclosure. The present disclosure is also applicable to an information processing apparatus such as a printer, a facsimile apparatus, a copy machine, a personal computer, a tablet terminal, a smartphone, a mobile phone, or the like.

As shown in FIG. 1 and FIG. 2, the multifunction peripheral 10 is an image forming apparatus including an ADF 1, an image reading portion 2, an image forming portion 3, a sheet feed cassette 4, a control portion 5, an operation display portion 6, an input/output control portion 7, and the like. The operation display portion 6 is a display input portion such as a touch panel which displays various information in accordance with control instructions from the control portion 5 and allows input, to the control portion 5, of various information in accordance with operation of users.

As shown in FIG. 1, the ADF 1 is an automatic document sheet conveying device including a document sheet set portion 11, a plurality of conveying rollers 12, a document sheet holding portion 13, and a sheet discharge portion 14. In the ADF 1, each conveying roller 12 is driven by a motor not shown. Accordingly, a document sheet placed on the document sheet set portion 11 passes through the reading position for image data by the image reading portion 2, to be conveyed to the sheet discharge portion 14. The image reading portion 2 can read image data from the document sheet conveyed by the ADF 1.

The image reading portion 2 includes a document sheet table 21, a reading unit 22, mirrors 23 and 24, an optical lens 25, and a CCD (Charge Coupled Device) 26. The document sheet table 21 is a document sheet placement portion provided on the upper surface of the image reading portion 2. The reading unit 22 includes an LED light source 221 and a mirror 222, and can move in a secondary scanning direction (left-right direction in FIG. 1) by a motor not shown. The LED light source 221 includes multiple white LEDs arranged along a primary scanning direction (depth direction in FIG. 1). The mirror 222 reflects, toward the mirror 23, light emitted by the LED light source 221 and reflected at the surface of the document sheet at the reading position on the document sheet table 21. The light reflected by the mirror 222 is guided by the mirrors 23 and 24 to the optical lens 25. The optical lens 25 converges the incident light to the CCD 26. The CCD 26 includes a photoelectric conversion element which inputs, to the control portion 5, an electric signal corresponding to the received amount of the incident light from the optical lens 25, as image data of the document sheet.

The image forming portion 3 executes an image forming process (printing process) according to electrophotography. The image forming portion 3 executes the image forming process based on image data read by the image reading portion 2 or image data inputted from an information processing apparatus such as an external personal computer or the like. As shown in FIG. 1, the image forming portion 3 includes a photosensitive drum 31, a charging device 32, an exposure device (LSU) 33, a developing device 34, a transfer roller 35, a cleaning device 36, a fixing roller 37, a pressurizing roller 38, and a sheet discharge tray 39. In the image forming portion 3, an image is formed, in the following procedure, on a paper sheet supplied from the sheet feed cassette 4, and then the paper sheet on which the image has been formed is discharged onto the sheet discharge tray 39.

The photosensitive drum 31 is uniformly charged at a predetermined potential by the charging device 32. Next, light based on the image data is applied to the surface of the photosensitive drum 31 by the exposure device 33. Thus, an electrostatic latent image corresponding to the image data is formed on the surface of the photosensitive drum 31. Then, the electrostatic latent image on the photosensitive drum 31 is developed (visualized) as a toner image by the developing device 34. A toner (developer) is supplied to the developing device 34 from a toner container 34A detachable from the image forming portion 3. Subsequently, the toner image formed on the photosensitive drum 31 is transferred onto a paper sheet by the transfer roller 35. Thereafter, the toner image transferred on the paper sheet is melted and fixed by heating by the fixing roller 37 when the paper sheet passes between the fixing roller 37 and the pressurizing roller 38. Toner remaining on the surface of the photosensitive drum 31 is removed by the cleaning device 36.

As shown in FIG. 2, the control portion 5 includes control devices such as a CPU 51, a ROM 52, a RAM 53, and an EEPROM 54. The CPU 51 is a processor which executes various calculation processes. The ROM 52 is a non-volatile storage portion in which information such as control programs for causing the CPU 51 to execute various processes is stored in advance. The RAM 53 is a volatile storage portion, and the EEPROM 54 is a non-volatile storage portion. The RAM 53 and the EEPROM 54 are temporary storage memories, and are used as work areas for various processes executed by the CPU 51.

The control portion 5 performs overall control of the multifunction peripheral 10 by executing, by use of the CPU 51, various control programs stored in advance in the ROM 52. The control portion 5 may be structured as an electronic circuit such as an integrated circuit (ASIC, DSP). Alternatively, the control portion 5 may be a control portion provided separately from a main control portion which performs overall control of the multifunction peripheral 10.

Furthermore, in the ROM 52 or the EEPROM 54 of the control portion 5, a program that causes the CPU 51 of the control portion 5 to execute a restart control process (see FIG. 3) described later is stored in advance. It should be noted that the program may be stored in a computer-readable storage medium such as a CD, a DVD, or a flash memory, and may be read from the storage medium to be installed on a storage portion such as the EEPROM 54 of the control portion 5.

As shown in FIG. 2, the input/output control portion 7 is a host bus adapter (HBA) to which a plurality of HDDs 8 (one example of an electronic device) can be connected. The input/output control portion 7 controls input/output of data between each HDD 8 and the multifunction peripheral 10. The HDD 8 is a hard disk drive in which electronic data such as image data read by the image reading portion 2 or image data inputted from an information processing apparatus such as an external personal computer is stored. The input/output control portion 7 executes, in accordance with control instructions from the control portion 5, a data transfer process with the HDD 8 in accordance with a transfer mode specified in advance such as the serial ATA specification. It should be noted that the multifunction peripheral 10 may include a plurality of the input/output control portions 7. Moreover, in addition to the HDD 8, a DVD drive, a BD drive, an SSD, or the like, is also one example of the electronic device that can be connected to the input/output control portion 7.

In the multifunction peripheral 10 having this configuration, there are cases where an abnormality occurs such as a communication abnormality with respect to an HDD 8 connected to the input/output control portion 7. In such a case, when the cause of the abnormality lies in the HDD 8, the abnormality can be eliminated by restarting (resetting) the HDD 8. On the other hand, when the cause of the abnormality lies in the input/output control portion 7, the communication abnormality can be eliminated by restarting (resetting) the input/output control portion 7. However, in a case where a plurality of the HDDs 8 are connected to the input/output control portion 7, if the input/output control portion 7 is restarted, operations of other HDDs 8 in which the abnormality has not occurred are affected.

Thus, in the multifunction peripheral 10, the restart control process described later is executed by the control portion 5, whereby restart of the input/output control portion 7 is allowed when a specific condition is satisfied. The control portion 5 is one example of a restart control portion according to the present disclosure. It should be noted that in a case where the multifunction peripheral 10 includes a plurality of the input/output control portions 7, the control portion 5 executes the restart control process for each of the input/output control portions 7.

[Restart Control Process]

Figure 3:
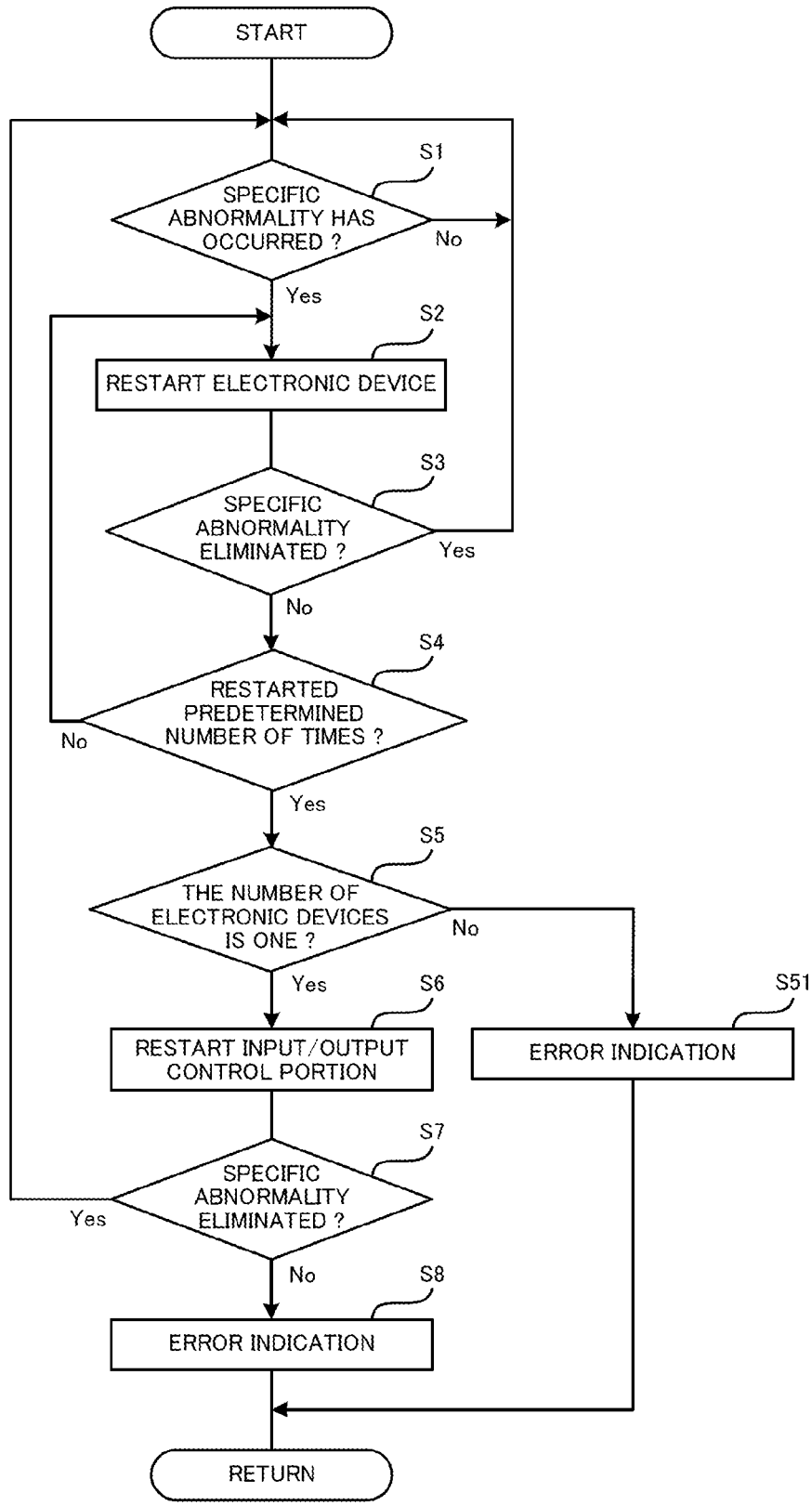
FIG. 3 is a flow chart showing one example of a restart control process to be executed in the multifunction peripheral according to the embodiment of the present disclosure.

Hereinafter, with reference to FIG. 3, one example of the procedure of the restart control process to be executed by the control portion 5 will be described. It should be noted that step S1, S2, . . . represent the numbers of process procedures (steps) to be executed by the control portion 5. The restart method according to the present disclosure includes procedures of the restart control process executed by the control portion 5.

<Step S1>

First, in step S1, with respect to at least one of the HDDs 8, the control portion 5 determines whether a specific abnormality defined in advance has occurred. The specific abnormality is, for example, a communication abnormality between the input/output control portion 7 and an HDD 8, or the like. The specific abnormality is not limited to the communication abnormality as long as it is an abnormality that is expected to be eliminated by restart of the input/output control portion 7 or the HDD 8.

Upon determining that the specific abnormality has occurred (Yes in S1), the control portion 5 shifts the process to step S2. When the specific abnormality has not occurred (No in S1), the control portion 5 waits until the specific abnormality occurs in step S1.

<Step S2>

In step S2, the control portion 5 restarts, among the HDDs 8 connected to the input/output control portion 7, the HDD 8 for which it has been determined that the specific abnormality has occurred in step S1. Thus, when the HDD 8 is restarted, in a case where the cause of the specific abnormality lies in the HDD 8, the specific abnormality can be eliminated. The content of the restart of the HDD 8 is, for example, software reset which restarts a program that operates in the HDD 8, or hardware reset which turns off/on the power source for the HDD 8.

Specifically, the control portion 5 controls the input/output control portion 7 to cause the input/output control portion 7 to transmit a restart signal to the HDD 8, thereby restarting the HDD 8. For example, in a case where the input/output control portion 7 is configured to operate in accordance with the AHCI (Advanced Host Controller Interface) specification, the control portion 5 causes the input/output control portion 7 to transmit a COMRESET signal to the HDD 8, thereby restarting the HDD 8. Alternatively, the control portion 5 may control the input/output control portion 7 to cause it to turn off/on the power supply from the input/output control portion 7 to the HDD 8, thereby restarting the HDD 8.

<Step S3>

Then, in step S3, the control portion 5 determines whether the specific abnormality has been eliminated by the restart of the HDD 8 performed in step S2. For example, when the specific abnormality is a communication abnormality, the control portion 5 controls the input/output control portion 7 to cause it to try the communication process with the HDD 8, thereby determining whether the communication abnormality has been eliminated.

Upon determining that the specific abnormality has been eliminated (Yes in S3), the control portion 5 shifts the process to step S1. On the other hand, upon determining that the specific abnormality has not been eliminated (No in S3), the control portion 5 shifts the process to step S4.

<Step S4>

In step S4, the control portion 5 determines whether the restart of the HDD 8 in step S2 has been performed a predetermined number of times. Upon determining that the restart of the HDD 8 has been performed the predetermined number of times (Yes in S4), the control portion 5 shifts the process to step S5. On the other hand, upon determining that the restart of the HDD 8 has not been performed the predetermined number of times (No in S4), the control portion 5 shifts the process to step S2. It should be noted that the predetermined number of times is, for example, twice or three times. In this manner, by the restart of the HDD 8 being repeated the predetermined number of times by the control portion 5, in a case where the cause of the specific abnormality is temporary, the specific abnormality can be eliminated. A conceivable cause of the temporary abnormality is noise mixed in the communication path between the input/output control portion 7 and the HDD 8.

<Step S5>

When the specific abnormality has not been eliminated by the restart of the HDD 8, then, in the next step S5, the control portion 5 determines whether the number of the HDDs 8 connected to the input/output control portion 7 is one. For example, when an HDD 8 gets connected to the input/output control portion 7, the control portion 5 stores, in the EEPROM 54, identification information of the HDD 8 connected to the input/output control portion 7. Thereafter, when the HDD 8 is disconnected from the input/output control portion 7, the control portion 5 deletes the identification information corresponding to the HDD 8 stored in the EEPROM 54. Then, the control portion 5 determines the number of the connected HDDs 8 based on the identification information stored in the EEPROM 54 or the like.

It is also conceivable that the control portion 5 stores, in the EEPROM 54, connection number information indicating the number of the HDDs 8 connected to the input/output control portion 7, and updates the connection number information at the time of connecting/disconnecting the HDD 8. Also in this case, the control portion 5 can determine, in step S5, the number of the connected HDDs 8 based on the connection number information. It is also conceivable that the control portion 5 executes, in step S5, polling processing for requesting reply from each HDD 8, thereby obtaining the number of the HDDs 8 currently connected to the input/output control portion 7.

Upon determining that the number of the HDDs 8 connected to the input/output control portion 7 is not one (No in S5), the control portion 5 shifts the process to step S51. On the other hand, upon determining that the number of the HDDs 8 connected to the input/output control portion 7 is one (Yes in S5), the control portion 5 shifts the process to step S6.

<Step S51>

In step S51, the control portion 5 causes the operation display portion 6 to display an error indication to the effect that the specific abnormality has not been eliminated. Then, the control portion 5 shifts the process to step S1, and newly determines the presence/absence of occurrence of the specific abnormality. That is, in the multifunction peripheral 10, when there are a plurality of the HDDs 8, restart of the input/output control portion 7 is prohibited. It is also conceivable, as another embodiment, that when a plurality of the HDDs 8 are connected to the input/output control portion 7, on a condition that the specific abnormality has occurred in all of the HDDs 8, the control portion 5 restarts the input/output control portion 7.

<Step S6>

On the other hand, in a case where the specific abnormality is not eliminated even after the HDD 8 has been restarted the predetermined number of times, and when the number of the HDDs 8 connected to the input/output control portion 7 is one, then, in the next step S6, the control portion 5 restarts the input/output control portion 7. That is, in the multifunction peripheral 10, only when the number of the HDDs 8 connected to the input/output control portion 7 is one, restart of the input/output control portion 7 is allowed.

For example, the control portion 5 restarts the input/output control portion 7 by transmitting a restart signal to the input/output control portion 7. Alternatively, the control portion 5 may restart the input/output control portion 7 by turning off/on the power supply to the input/output control portion 7. It should be noted that the input/output control portion 7 may restart the HDD 8 after the restart in step S6 has been performed.

As described above, when the input/output control portion 7 has been restarted in step S6, in a case where the cause of the specific abnormality lies in the input/output control portion 7, the specific abnormality can be eliminated. For example, when the specific abnormality is a communication abnormality, the communication connection between the input/output control portion 7 and the HDD 8 is disconnected and then connected again, whereby the communication abnormality is eliminated. Since the number of the HDDs 8 connected to the input/output control portion 7 is one, operations of other HDDs 8 in which the specific abnormality has not occurred are not affected by restarting the input/output control portion 7, unlike the case where a plurality of the HDDs 8 are connected to the input/output control portion 7.

<Step S7>

Then, in step S7, the control portion 5 determines whether the specific abnormality has been eliminated by the restart of the input/output control portion 7 performed in step S6. For example, when the specific abnormality is a communication abnormality, the control portion 5 controls the input/output control portion 7 to cause it to try the communication process with the HDD 8, thereby determining whether the communication abnormality has been eliminated.

Upon determining that the specific abnormality has been eliminated (Yes in S7), the control portion 5 shifts the process to step S1. On the other hand, upon determining that the specific abnormality has not been eliminated (No in S7), the control portion 5 shifts the process to step S8.

<Step S8>

In step S8, after causing the operation display portion 6 to display an error indication to the effect that the specific abnormality has not been eliminated, the control portion 5 shifts the process to step S1, and newly determines the presence/absence of occurrence of the specific abnormality.

In the multifunction peripheral 10 described above, when the specific abnormality has occurred with respect to an HDD 8, in accordance with the number of the HDDs 8 connected to the input/output control portion 7, whether to restart the input/output control portion 7 is switched. Specifically, only on the specific condition that the number of the HDDs 8 connected to the input/output control portion 7 is one, restart of the input/output control portion 7 is allowed, and when the number of the HDDs 8 connected to the input/output control portion 7 is a plurality, restart of the input/output control portion 7 is prohibited. Therefore, in the multifunction peripheral 10, restart of the input/output control portion 7 is prevented when other HDDs 8 in which the specific abnormality has not occurred will be affected. For example, occurrence of data loss is prevented that would be caused when the input/output control portion 7 is restarted while data is being transferred between the input/output control portion 7 and the HDD 8.

In a case where a plurality of the input/output control portions 7 are provided in the multifunction peripheral 10, and when the HDDs 8, the number of which is fewer than or equal to the number of the input/output control portions 7, are to be connected to the multifunction peripheral 10, it is desirable not to connect two or more HDDs 8 to each of the input/output control portions 7. Accordingly, in the above-mentioned restart control process, the control portion 5 can restart the input/output control portion 7 when the specific abnormality has occurred in an HDD 8.

Moreover, for example, in a case where the HDDs 8, the number of which is fewer than or equal to the number of the input/output control portions 7 included in the multifunction peripheral 10, are connected to the multifunction peripheral 10, and when a plurality of the HDDs 8 are connected to one input/output control portion 7, the control portion 5 may cause the operation display portion 6 to display a guide display that suggests that the number of the HDDs 8 connected to each input/output control portion 7 should be one. The guide display may include identification information regarding an input/output control portion 7 to which no HDD 8 is connected.

[Another Example of Restart Control Process]

In the restart control process (see FIG. 3) in the above embodiment, an exemplary case has been described in which even when the number of the HDDs 8 connected to the input/output control portion 7 is one, the input/output control portion 7 is restarted after the HDD 8 has been restarted. On the other hand, it is also conceivable that when the number of the HDDs 8 connected to the input/output control portion 7 is one, the input/output control portion 7 is restarted first.

In the following, with reference to FIG. 4, another example of the restart control process to be executed by the control portion 5 in the multifunction peripheral 10 will be described. It should be noted that the process procedures that are the same as those in the restart control process shown in FIG. 3 are denoted by the same reference characters, and description thereof is omitted. Specifically, in the restart control process shown in FIG. 4, the processes of steps S2 to S4 are omitted, and instead of the process of step S51, the process of step S52 is executed.

Figure 4:
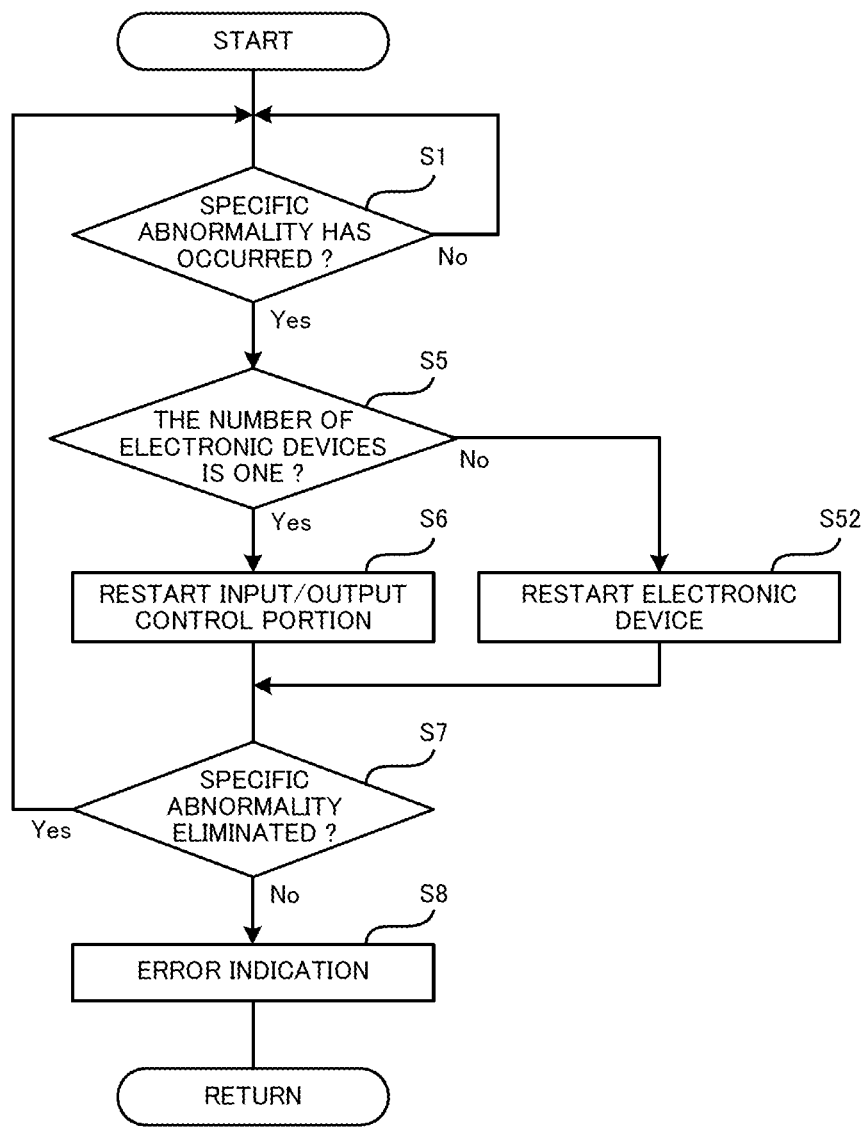
FIG. 4 is a flow chart showing another example of the restart control process to be executed in the multifunction peripheral according to the embodiment of the present disclosure.

As shown in FIG. 4, upon determining that the specific abnormality has occurred with respect to an HDD 8 (Yes in S1), then, in the next step S5, the control portion 5 determines whether the number of the HDDs 8 connected to the input/output control portion 7 is one. When the number of the HDDs 8 is a plurality (No in S5), then, in the next step S52, the control portion 5 restarts the HDD 8 as in step S2, without restarting the input/output control portion 7. It should be noted that, in step S52, the control portion 5 may repeat restart of the HDD 8 up to a predetermined number of times until the specific abnormality is eliminated.

On the other hand, when the number of the HDDs 8 is one (Yes in S5), then, in the next step S6, the control portion 5 restarts the input/output control portion 7. That is, in a case where the specific abnormality has occurred with respect to an HDD 8, and when the number of the HDDs 8 connected to the input/output control portion 7 is one, the control portion 5 immediately restarts the input/output control portion 7 without restarting the HDD 8. At this time, after the input/output control portion 7 is restarted in step S6, the HDD 8 may be restarted. Accordingly, in step S6, the input/output control portion 7 and the HDD 8 are both restarted, and thus, compared with a case where only the HDD 8 is restarted, the possibility of the specific abnormality being eliminated is increased.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
   at least one input-output control portion configured to be able to have a plurality of electronic devices connected thereto, and configured to control input or output between the information processing apparatus and one or more electronic devices connected to the input-output control portion among the plurality of electronic devices; and
   a restart control portion configured to, in a case where a predetermined abnormality has occurred in an electronic device among the one or more electronic devices connected to the input-output control portion, restart the input-output control portion when the number of the one or more electronic devices connected to the input-output control portion is one, and prohibit a restart of the input-output control portion when the number of the one or more electronic devices connected to the input-output control portion is greater than one.

2. The information processing apparatus according to claim 1, wherein
in a case where the abnormality has occurred in an electronic device among the one or more electronic devices connected to the input-output control portion, the restart control portion restarts the electronic device in which the abnormality has occurred, and in a case where the abnormality remains in the electronic device after a restart of the electronic device and when the number of the electronic devices connected to the input-output control portion is one, the restart control portion restarts the input-output control portion.

3. The information processing apparatus according to claim 2, wherein
in a case where the abnormality remains in the electronic device even after the electronic device has been restarted a predetermined number of times set in advance, the restart control portion restarts the input-output control portion.

4. The information processing apparatus according to claim 1, wherein
the at least one input-output control portion is a plurality of input-output control portions, and
the restart control portion switches, for each of the plurality of input-output control portions, whether to restart a respective input-output control portion in a case where the abnormality has occurred in an electronic device connected to the respective input-output control portion.

5. The information processing apparatus according to claim 1, wherein
in a case where the abnormality has occurred in an electronic device, even when the number of the electronic devices connected to the input-output control portion is greater than one, if the abnormality has occurred in all of the electronic devices connected to the input-output control portion, the restart control portion restarts the input-output control portion.

6. The information processing apparatus according to claim 1, wherein
the input-output control portion executes a data transfer process with each electronic device in accordance with a serial ATA specification.

7. A method for restarting an input-output control portion in an information processing apparatus, the input-output control portion configured to be able to have a plurality of electronic devices connected thereto and configured to control input or output between the information processing apparatus and one or more electronic devices connected to the input-output control portion among the plurality of electronic devices, the method comprising:
a step of determining the number of the one or more electronic devices connected to the input-output control portion; and
a step of, in a case where a predetermined abnormality has occurred in an electronic device among the one or more electronic devices connected to the input-output control portion, restarting the input-output control portion when the number of the one or more electronic devices connected to the input-output control portion is one, and prohibiting a restart of the input-output control portion when the number of the one or more electronic devices connected to the input-output control portion is greater than one.

* * * * *